Oct. 10, 1950     B. W. R. HICKMOTT     2,524,974
VENTILATING APPARATUS
Filed July 11, 1947     2 Sheets-Sheet 1
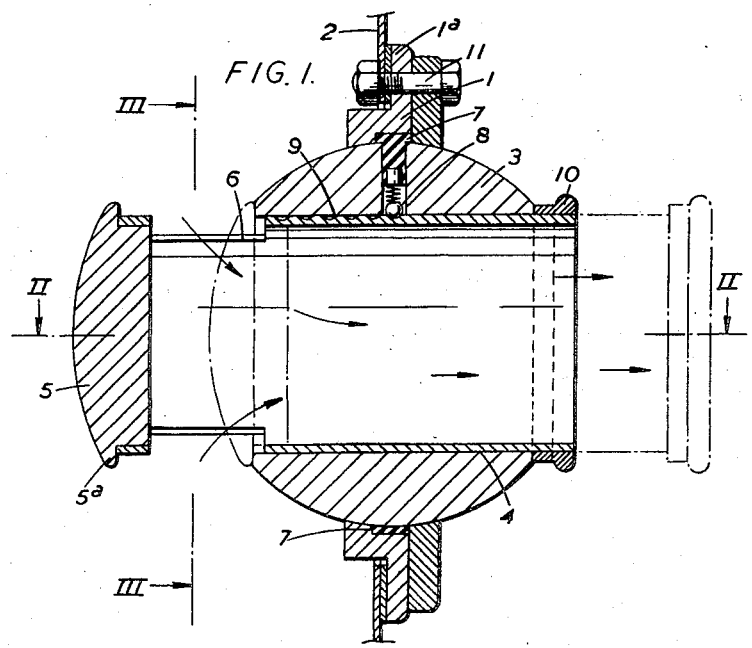
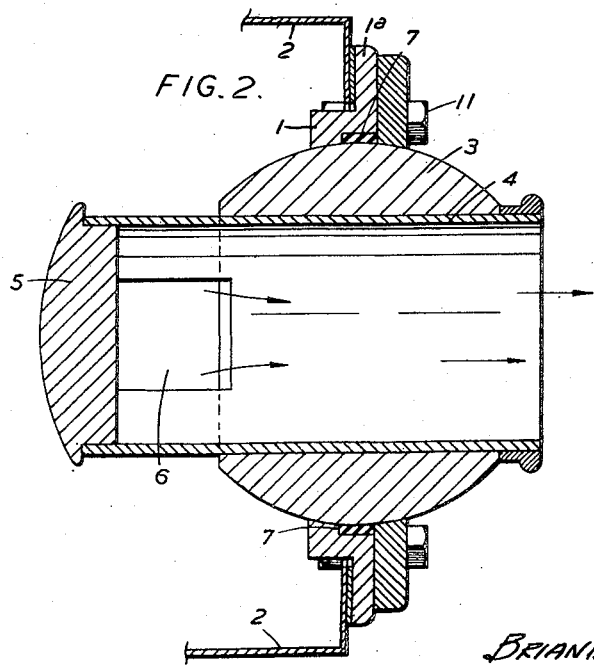
Inventor
BRIAN W. R. HICKMOTT
By
Young, Emery & Thompson
Attorneys Oct. 10, 1950     B. W. R. HICKMOTT     2,524,974
VENTILATING APPARATUS
Filed July 11, 1947     2 Sheets-Sheet 2
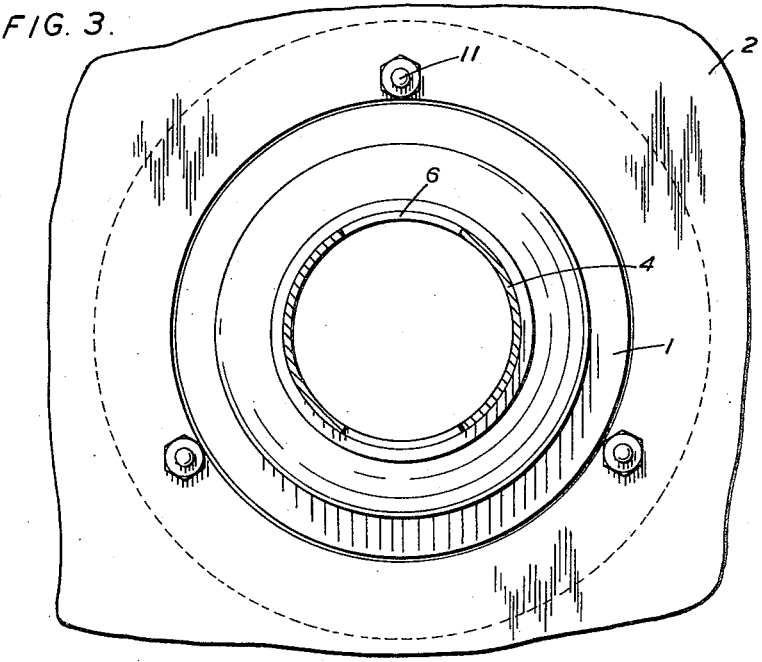
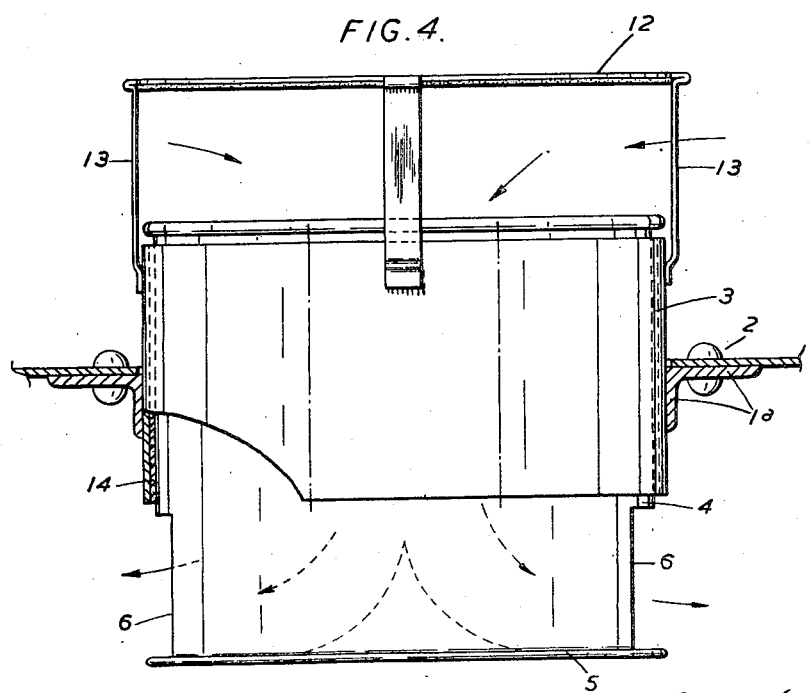
Inventor
BRIAN W. R. HICKMOTT
By
*Young, Emery & Thompson*
Attorneys Patented Oct. 10, 1950

2,524,974

UNITED STATES PATENT OFFICE 2,524,974

VENTILATING APPARATUS

Brian William Russell Hickmott, London, England, assignor to Norvent Limited, Newcastle-on-Tyne, England, a British company Application July 11, 1947, Serial No. 760,357
In Great Britain January 17, 1946

Section 1, Public Law 690, August 8, 1946
Patent expires January 17, 1966

1 Claim. (Cl. 98—40)

This invention relates to ventilators or air diffusers used for admitting and directing air from a duct into a room or the like, and has for its object to provide a new or improved means for regulating the amount of air admitted through the ventilator or diffuser.

According to this invention, the unit which incorporates an air nozzle or tube through which the air from the duct can pass is provided with a plate or member in a plane parallel to the plane of the end of the nozzle or tube, and means are provided whereby the plate or member can be adjusted in relation to the end of the nozzle or tube and held in such adjusted position to vary the opening between the end of the nozzle or tube and the plate or member, or the plate or member can be closed onto the end of the nozzle or tube.

Further according to this invention, a fixed plate may be provided at a distance from the inlet to the nozzle or tube and the plate or member connected at a distance from an inner sleeve movable in the nozzle or tube whereby on moving the plate or member, the inner sleeve is correspondingly moved in relation to the fixed plate.

The invention will be clearly understood from the following description aided by the accompanying drawings in which:

Figure 1 is a section of a ventilator according to one example of carrying the invention into effect. Figure 2 is a section on the line II—II, and Figure 3 a section on the line III—III of Figure 1, and Figure 4 is a section of a modified construction.

The invention can be carried into effect in various ways as to detailed construction.

One example of carrying the invention into effect is illustrated in Figures 1, 2 and 3 of the accompanying drawings, in which the unit incorporates a socket 1 in the form of a built-up ring having a flange 1a by which the unit can be secured in an aperture in the air duct 2, the bore of the ring being curved to form the socket 1.

In the socket 1 is located the nozzle 3 comprising a cylindrical bored tube having its wall on the outside formed as or encased in a ball shaped portion adapted to be engaged in and work in the aforesaid socket 1 as a ball and socket joint.

In the nozzle 3 is slidably positioned an inner sleeve 4 open at one end and carrying at the other end a plate 5 or member, the wall of the sleeve 4 at this end being formed with apertures 6.

An airtight packing ring 7 is positioned in a recess in the socket 1 and a spring loaded ball 8 is provided in the nozzle 3 adapted to engage with dimples 9 or recesses in the inner sleeve 4, or the sleeve 4 may be plain and the ball frictionally engage with same.

The open end of the inner sleeve 4 is provided with a beaded collar 10 and the plate 5 at the other end with a rim 5a of larger diameter than the outside diameter of the sleeve 4.

The unit is secured in an aperture in the duct 2 by bolts 11 and may be in the side of the duct 2 as shown in Figures 1, 2 and 3 of the drawings, or may be secured in the underside of the duct 2 in which case the unit may be arranged in the opposite way round, that is with the plate 5 on the outside.

The inner sleeve 4 can be slid in the socket 1 so that the plate 5 can be moved away from the end of the nozzle 3 to a distance to allow of maximum flow of air through the apertures 6 between the end of the nozzle 3 and the plate 5 in which position the beaded collar 10 contacts with the other end of the nozzle 3 as shown in full lines in Figure 1, or the inner sleeve 4 can be moved for the plate 5 to cover the end of the nozzle 3 to close the nozzle and stop the flow of air as shown in dot and dash lines in Figure 1, or the sleeve 4 can be positioned at any intermediate point to regulate the amount of air passing through the nozzle 3.

The plate 5 may be provided on the inner side with an air diffuser of somewhat conical shape or may be covered with felt or other material.

In the second example shown in Figure 4, the unit incorporates a fixed nozzle 3 or tube provided with a flange 1a for securing the unit in an aperture in the air duct 2. Above the inlet of the nozzle 3 and at a suitable distance therefrom is a fixed baffle plate 12 which may conveniently be secured to the inlet end of the nozzle 3 by spaced strips 13 or supports.

In the nozzle 3 is slidably positioned the inner sleeve 4 provided with the apertures 6 and plate 5 or member.

The inside of the fixed nozzle 3 or tube may be covered with felt 14 or other material in which the inner sleeve 4 frictionally slides and can be held in the adjusted position by the grip of the felt or other material.

When the bottom plate 5 is pushed upwards, the sliding inner sleeve 4 is in turn forced upwards towards the fixed baffle plate 12 so that the opening between the fixed baffle plate 12 and the entrance to the nozzle 3 may be adjusted in relation to the opening between the outlet of the nozzle and the plate 5.

Inside circular or other guide vanes may be provided in the inner sleeve 4 to ensure equitable distribution of the air, particularly in large size units.

What I claim as my invention is:

A device of the character described for admitting air from a duct into a room comprising a spherical member having a bore extending axially through the same forming an air nozzle, a socket forming member mounted on an opening in said duct, and supporting said spherical member for universal movement, a tubular sleeve mounted within said bore for axial movement and of a length greater than the length of said bore in the spherical member, said sleeve being open at one end within the duct, a cap closing the other end of said sleeve, said sleeve having lateral openings in the wall thereof adjacent the closed end, said sleeve having an axial disposed series of notches in the outer surface thereof, said spherical member having a ball socket extending perpendicularly to the axis of the sleeve, and a spring loaded ball in said ball socket entering the notches to retain the sleeve in axially adjusted positions.

BRIAN WILLIAM RUSSELL HICKMOTT.

REFERENCES CITED

The following references are of record in the file of this patent:

UNITED STATES PATENTS

| Number | Name | Date |
|---|---|---|
| 2,016,778 | Hall et al. | Oct. 8, 1935 |
| 2,197,614 | Hall et al. | Apr. 16, 1940 |
| 2,372,830 | Honerkamp et al. | Apr. 3, 1945 |

FOREIGN PATENTS

| Number | Country | Date |
|---|---|---|
| 105,175 | Great Britain | Apr. 5, 1917 |
| 351,050 | Great Britain | June 22, 1931 |
| 472,863 | Great Britain | Oct. 1, 1937 |
| 512,169 | Great Britain | Aug. 30, 1939 |
| 520,452 | Great Britain | Apr. 24, 1940 |